United States Patent [19]

Dillmann

[11] Patent Number: 5,089,211
[45] Date of Patent: Feb. 18, 1992

[54] CONTROL ROD DRIVE

[75] Inventor: Charles W. Dillmann, Morgan Hill, Calif.

[73] Assignee: General Electric Company, San Jose, Calif.

[21] Appl. No.: 653,603

[22] Filed: Feb. 11, 1991

[51] Int. Cl.$^5$ .............................................. G21C 7/14
[52] U.S. Cl. .................................. 376/232; 376/242; 376/228
[58] Field of Search ............... 376/227, 228, 230, 231, 376/232, 294

[56] References Cited

U.S. PATENT DOCUMENTS

| | | | |
|---|---|---|---|
| 3,264,952 | 8/1966 | Winders | 376/230 |
| 3,728,219 | 4/1973 | Mattern et al. | 376/230 |
| 3,785,923 | 1/1974 | Bratoljic et al. | 376/227 |
| 3,945,514 | 3/1976 | Dose | 214/27 |
| 4,044,622 | 8/1977 | Matthews | 74/424.8 R |
| 4,238,288 | 12/1980 | Anikin et al. | 176/36 R |
| 4,423,002 | 12/1983 | Wiart et al. | 376/227 |
| 4,518,559 | 5/1985 | Fischer et al. | 376/230 |
| 4,624,825 | 11/1986 | Martin et al. | 376/227 |
| 4,661,307 | 4/1987 | Guillot | 376/232 |

OTHER PUBLICATIONS

D. R. Wilkins et al, "Advanced BWR: Design Improvements Build on Proven Technology," Nuclear Engineering International Reprint Jun. 86, cover, pp. 1-7, and two-page drawing excerpt.

Westinghouse Electric Corp., (G, Masche), "3.2 Control Rod Drive Mechanisms," Systems Summary of a Westinghouse Pressurized Water Reactor Nuclear Power Plant, 1971, pages: Cover and three follow pages; pp. 47-51; and FIG. 2-2.

Primary Examiner—Brooks H. Hunt
Assistant Examiner—Frederick H. Voss
Attorney, Agent, or Firm—Robert R. Schroeder

[57] ABSTRACT

A drive for moving a control rod in a pressure vessel containing a pressurized fluid includes a spindle disposed solely within the pressure vessel, which spindle is effective for moving the control rod upon rotation thereof. A driven rotor is fixedly joined to the spindle within the pressure vessel for rotating the spindle, and the driven rotor is selectively rotated in first and second opposite directions without the need for packing-type seal assemblies for preventing leakage of the pressurized fluid from the pressure vessel adjacent to the spindle.

11 Claims, 6 Drawing Sheets

CONTROL ROD DRIVE

TECHNICAL FIELD

The present invention relates generally to control rod drives used in nuclear reactors and, more specifically, to a control rod drive which eliminates conventional packing-type seal assemblies for the rotating spindle thereof.

BACKGROUND ART

In one type of nuclear reactor, control rods are selectively inserted and withdrawn from a nuclear reactor pressure vessel for controlling the operation thereof. Each of the control rods is typically positioned by a conventional control rod drive which includes a ball screw or spindle threadingly engaging a ball nut for raising and lowering the ball nut as the spindle is rotated either clockwise or counterclockwise. A hollow piston rests upon the ball nut at one end thereof and at its other end is conventionally joined to the control rod. Displacement of the ball nut provides displacement of the piston which in turn inserts or withdraws the control rod in the reactor vessel.

In order to achieve faster insertion of the control rod than could be obtained by normal rotation of the ball spindle, which is conventionally referred to as a scram operation, a rapid flow of high-pressure water is injected through the control rod drive past the piston for lifting the piston off the ball nut in a relatively short time for quickly inserting the control rod into the reactor vessel. The high-pressure water is channeled to the control rod drive through a scram line pipe attached to a high-pressure water accumulator.

In one type of occurrence which allows for rapid backflow of the water past the piston, due to, for example, a break in the scram line, the backflow may cause a large reverse pressure on the piston which in turn provides a back force on the control rod ball nut. This back force can cause reverse rotation of the ball spindle with corresponding withdrawal of the control rod. Withdrawal of one of the control rods due to such a backflow occurrence may cause damage to adjacent fuel in the reactor vessel, requiring replacement thereof leading to undesirable down time of the reactor and economic losses.

In order to prevent the above occurrence, a conventional electromechanical brake is provided in the control rod drive for holding the ball spindle from rotating unless the brake is energized. The brake is sized for restraining rotation of the ball spindle against such forces due to backflow of water over the piston when the control rod drive motor is not operating. And, when the control rod drive motor is operating, the motor itself is sized for providing adequate torque for resisting the forces due to the backflow of water in the event of the above-described occurrence.

The scram-line water provided to the control rod drive is conventionally discharged from the housing of the drive into the main reactor pressure vessel. Under normal operating conditions the scram-line water flows continuously as purge flow at a pressure greater than that of the reactor coolant flowing inside the reactor vessel. In a scram operation, the accumulator discharges and thus increases the pressure of the scram-line water. The reactor coolant normally flowing inside the reactor vessel in an exemplary boiling water reactor has a pressure of about 73 kg/cm$^2$ (1,040 psi) and a temperature of about 270° C. (518° F.), with the purge flow pressure being correspondingly higher. Accordingly, the control rod drive housing which is joined to the main reactor vessel forms part of the pressure vessel which is subject to high pressure and temperature water. And, during the scram operation, the pressure of the scram-line water channeled into the control rod drive housing has yet even higher pressure.

In an exemplary control rod drive, the ball spindle is rotated by a conventional motor mounted outside of the pressure vessel. Therefore, the ball spindle extends through the pressure vessel and thus requires a suitable seal, such as a conventional packing-type seal assembly for preventing unacceptable leakage of the high pressure, high temperature reactor coolant and purge flow from the control rod housing to outside of the pressure vessel. Such a seal assembly results in a more complex control rod drive, is typically renewed periodically which adds to downtime of the reactor and costs, and may also be subject to occasional undesirable sticking of the packing seal and the ball spindle which temporarily resists rotation of the ball spindle.

OBJECTS OF THE INVENTION

Accordingly, one object of the present invention is to provide a new and improved control rod drive for eliminating packing-type seal assemblies for the spindle thereof.

Another object of the present invention is to provide such a control rod drive which may also include a brake for the spindle without leaking pressurized fluid.

DISCLOSURE OF INVENTION

A drive for moving a control rod in a pressure vessel containing a pressurized fluid includes a spindle disposed solely within the pressure vessel, which spindle is effective for moving the control rod upon rotation thereof. A driven rotor is fixedly joined to the spindle within the pressure vessel for rotating the spindle, and means are provided for selectively rotating the driven rotor in first and second opposite directions without the need for packing-type seal assemblies for preventing leakage of the pressurized fluid from the pressure vessel adjacent to the spindle.

BRIEF DESCRIPTION OF DRAWINGS

The novel features believed characteristic of the invention are set forth and differentiated in the claims. The invention, in accordance with preferred and exemplary embodiments, together with further objects and advantages thereof, is more particularly described in the following detailed description taken in conjunction with the accompanying drawing in which:

MODE(S) FOR CARRYING OUT THE INVENTION

Figure 1:
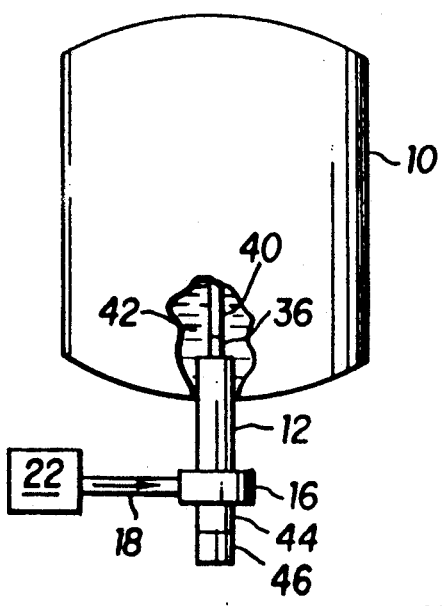
FIG. 1 is a schematic representation of a nuclear reactor pressure vessel including a control rod drive in accordance with one embodiment of the present invention.
Figure 2:
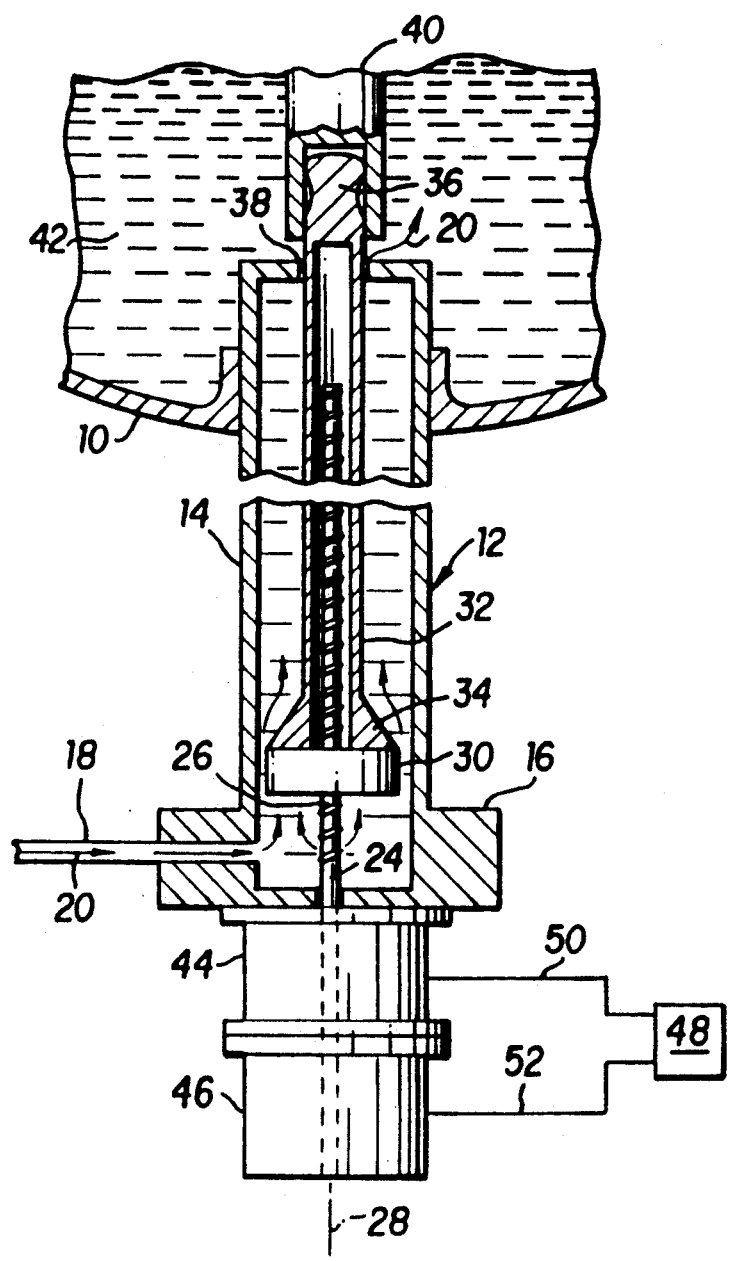
FIG. 2 is an enlarged sectional view, partly schematic, of the control rod drive illustrated in FIG. 1.

Illustrated in FIG. 1 is an exemplary nuclear reactor pressure vessel 10 of the boiling water type having a plurality of fine motion control rod drives 12 (FMCRD), only one of which is shown. In one exemplary embodiment, there are 205 FMCRDs 12 extending into the vessel 10 through the bottom thereof. Referring also to FIG. 2, an enlarged, sectional view of one of the control rod drives 12 is illustrated. The rod drive 12 includes a tubular housing 14 extending outwardly from the vessel 10 and conventionally secured thereto. The housing 14 is conventionally connected to a flange or manifold 16 which is disposed in flow communication with a scram line or conduit 18 which is conventionally selectively provided with high-pressure scram-line water 20 from a conventional high-pressure water accumulator 22 conventionally joined to the scram line 18.

Conventionally disposed inside the housing 14 is a conventional ball screw or spindle 24, which in this exemplary embodiment includes conventional right-handed threads 26. The control rod drive 12 includes a longitudinal centerline axis 28, with the housing 14 and spindle 24 being disposed coaxially therewith.

A conventional ball nut 30 is positioned over the spindle 24 and is conventionally restrained from rotating therewith so that as the spindle is rotated in a clockwise direction, the ball nut is translated in a downward direction away from the vessel 10, and when the spindle is rotated in a counterclockwise direction, the ball nut 30 is translated in an upward direction toward the vessel 10. A conventional hollow, elongate piston 32 is disposed coaxially with the spindle 24 and includes a conical base end 34 which rests on the ball nut 30, and a tip end 36 extending through a central aperture 38 in the outer end of the housing 14 into the vessel 10. The tip end 36 is conventionally coupled to a respective control rod 40 by a bayonet coupling, for example, and, therefore, rotation of the spindle 24 either moves the control rod upwardly or downwardly.

As shown in FIGS. 1 and 2, the pressure vessel 10 conventionally includes a pressurized coolant 42, also referred to as reactor coolant, which is conventionally channeled through the pressure vessel 10 for providing cooling therein. The reactor coolant 42 in an exemplary embodiment of the vessel 10 has an operating pressure of about 73 kg/cm$^2$ (1,040 psi) at a temperature of about 270° C. (518° F.). The control rod drive housing 14 is conventionally, fixedly joined to the vessel 10 and forms part of the pressure vessel 10 since the reactor coolant 42 is in flow communication with the aperture 38 of the housing 14 and with the housing 14 surrounding the spindle 24.

Under normal operating conditions, the scram-line water 20 flows continuously through the housing 14 and into the vessel 10 as a pressurized fluid, or purge flow, at a pressure greater than that of the reactor coolant 42. In a scram operation, the accumulator 22 discharges and thus further increases the pressure of the scram-line water 20.

As illustrated in FIG. 2, the spindle 24 is surrounded by the pressurized fluid 20. In a conventional control rod drive, the spindle 24 would extend through the pressure vessel, i.e., the manifold 16 portion of the pressure vessel, to an electrical motor disposed outside the pressure vessel (not shown). In such a conventional assembly, a conventional packing-type seal assembly (not shown) surrounds the spindle 24 where it penetrates the pressure vessel for preventing the leakage of the pressurized fluid 20 from the pressure vessel 10.

In accordance with one embodiment of the present invention, the control rod drive 12 further includes a motor 44 conventionally fixedly joined to the manifold 16 and forming a part of the pressure vessel 10. In the preferred embodiment, the drive 12 also includes a brake 46 conventionally fixedly joined to the motor 44 and also forming a part of the pressure vessel 10. Also in the preferred embodiment of the present invention, the spindle 24 is disposed solely within the pressure vessel 10, and in particular the spindle 24 extends into the motor 44 and the brake 46 which form part of the pressure vessel 10 so that the spindle 24 does not penetrate the pressure vessel, which would otherwise require a suitable type of seal such as a packing-type seal assembly.

The motor 44 is conventionally connected to a conventional control 48 by a first electrical line 50 for selectively energizing and deenergizing the motor 44. The brake 46 is conventionally connected to the control 48 by a second electrical line 52 and is selectively energized and deenergized for allowing unrestricted rotation of the spindle 24 or preventing rotation of the spindle 24, respectively.

Figure 3:
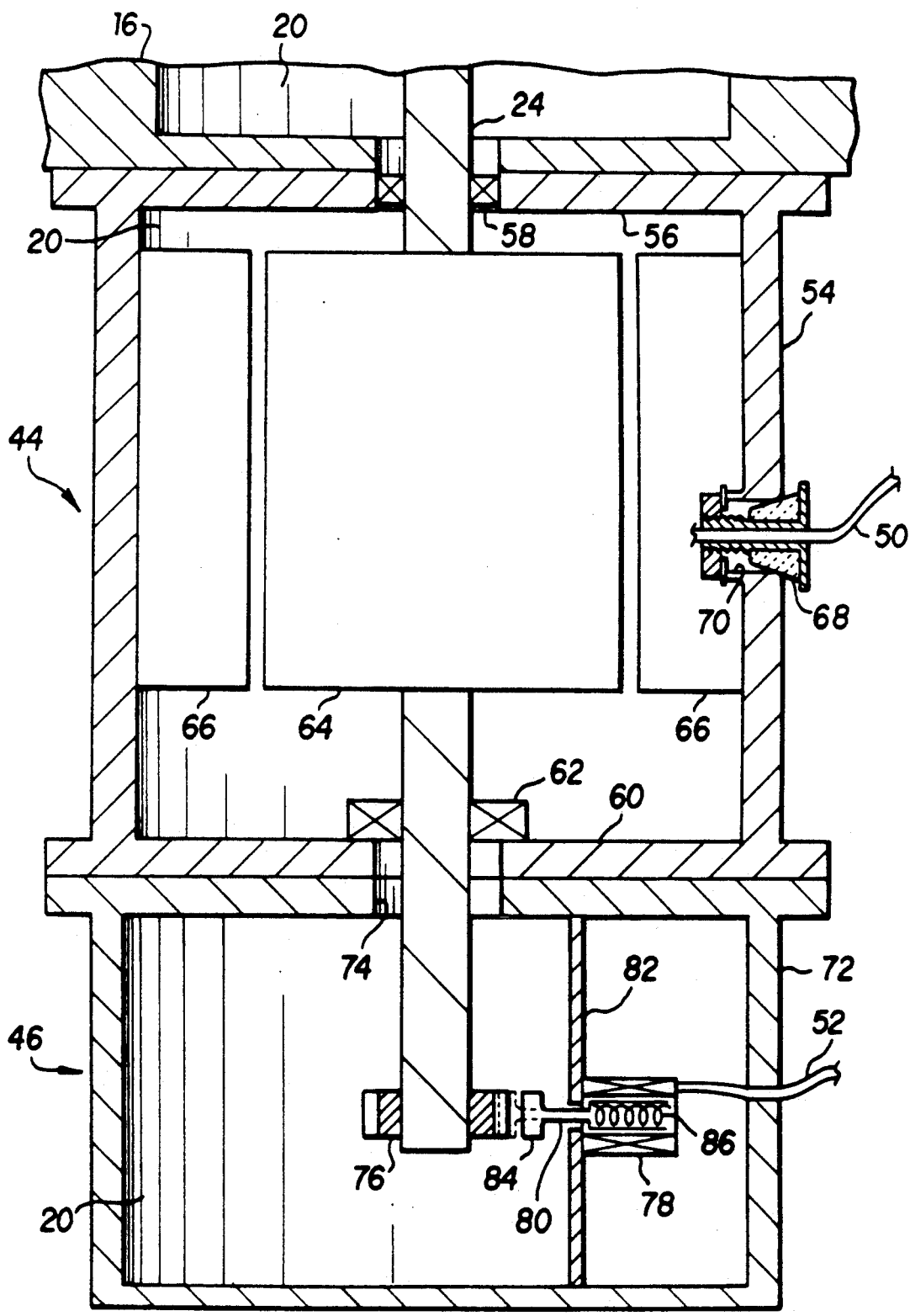
FIG. 3 is an enlarged longitudinal sectional schematic view of the control rod drive of FIG. 2, including a motor and brake, in accordance with one embodiment of the invention.

Illustrated in FIG. 3 is a longitudinal, sectional, schematic view of the motor 44 and the brake 46 in accordance with one embodiment of the present invention. The motor 44 includes an annular motor housing 54 which is conventionally fixedly joined to the manifold 16 for forming part of the pressure vessel 10. The housing 54 includes a plurality of circumferentially spaced first spokes 56 which support a conventional first bearing 58 which in turn supports a portion of the spindle 24. No seals are provided between the first spokes 56, first bearing 58 and the manifold 16 so that the pressurized fluid 20 is allowed to flow freely inside the motor housing 54.

The housing 54 also includes a plurality of circumferentially spaced second spokes 60 which conventionally support a second bearing 62, which in turn supports another portion of the spindle 24.

In this exemplary embodiment of the present invention, the motor 44 includes a driven rotor 64 which comprises a conventional electrical motor armature and is fixedly joined to the spindle 24 for rotation therewith within the pressure vessel or housing 54. The motor 44 further includes means 66 in the form of a conventional electrical motor stator, for selectively rotating the armature 64 in first and second opposite directions, corresponding to clockwise and counterclockwise rotation, respectively, of the spindle 24. In this embodiment of the invention, both the armature 64 and the stator 66 are disposed inside the pressure vessel motor housing 54 in contact with the pressurized fluid 20. In this way, the spindle 24 is not required to breach the pressure vessel and, therefore, a suitable seal for preventing leakage therethrough is not required. The armature 64 and the stator 66 may be conventionally sealed themselves for preventing electrical short circuits therein.

The only required breaching of the motor housing 54 in this exemplary embodiment, is for the first electrical line 50 which may be conventionally channeled through the housing 54 to the stator 66. For example, a conventional elastomeric bushing 68 surrounds the first electrical line 50 and is compressed against both the line 50 and a complementary aperture 70 through the housing 54 by a hollow bolt and nut assembly for providing a leakproof seal. As is conventionally known, sealing of a nonrotating member such as sealing of the first electrical line 50 by the bushing 68 provides a more effective seal which is not subject to wear due to rotation as would exist at a rotating shaft, such as the spindle 24, through a pressure vessel. Since both the armature 64 and the stator 66 of the motor 44 are both contained inside the housing 54, a conventional packing-type seal is not required. The control 48 selectively energizes the stator 66 through the first electrical line 50 for magnetically rotating the armature 66 and the spindle 24 in either the clockwise direction, or the counterclockwise direction.

Also as illustrated in FIG. 3, the exemplary brake 46 includes an annular brake housing 72 which is conventionally fixedly joined to the motor housing 54 for also forming part of the pressure vessel 10. The brake housing 72 includes an aperture 74 through which a portion of the spindle 24 extends inside the brake housing 72 from the motor housing 54. The aperture 74 allows the pressurized fluid 20 to flow into the brake housing 72. Since the brake housing 72 forms part of the pressure vessel 10, the spindle 24 is disposed solely within the pressure vessel 10, and need not breach the pressure vessel 10 for braking by the brake 46, which typically occurs in a conventional assembly (not shown).

In this exemplary embodiment of the brake 46, the brake 46 comprises a braking gear 76 conventionally fixedly joined to the spindle 24, and a conventional electrical solenoid 78 having an extendable plunger 80 disposed therein. The solenoid 78 is conventionally fixedly joined to an elongate, stationary mounting support 82 joined to the housing 72. A braking latch 84 is integrally joined to the plunger 80 and has a gear-tooth shape complementary to the teeth of the gear 76. The latch 84 is positionable in an engaged position with the gear 76, as shown in dashed line in FIG. 3, upon extension of the plunger 80 for preventing rotation of the spindle 24 in at least one of the first and second directions when the solenoid is deenergized. In the preferred embodiment of the present invention, a conventional compression spring 86 is disposed inside the plunger 80 within the solenoid 78 to urge the plunger 80 toward the gear 76 when the solenoid 78 is deenergized. When the solenoid 78 is energized by power provided through the second electrical line 52, suitable electromagnetic force retracts the plunger 80, further compressing the spring 86 to position the braking latch 84 in a disengaged position from the gear 76 for allowing unrestricted rotation of the spindle 24.

As illustrated in FIG. 3, the gear 76, solenoid 78, and braking latch 84 are all disposed inside the housing 72, i.e., within the pressure vessel, and are all subject to the pressurized fluid 20. In this way, the only breach of the pressure vessel brake housing 72 is for the second electrical line 52, at which breach a suitable seal, such as the bushing 68 assembly used in the motor housing 54, may be used for effectively sealing the second electrical line 52 to the housing 72. In an alternate embodiment of the invention, the solenoid 78 could be suitably located outside the pressure vessel motor housing 72 to magnetically draw toward the housing 72 a suitable plunger and latch (not shown).

Figure 4:
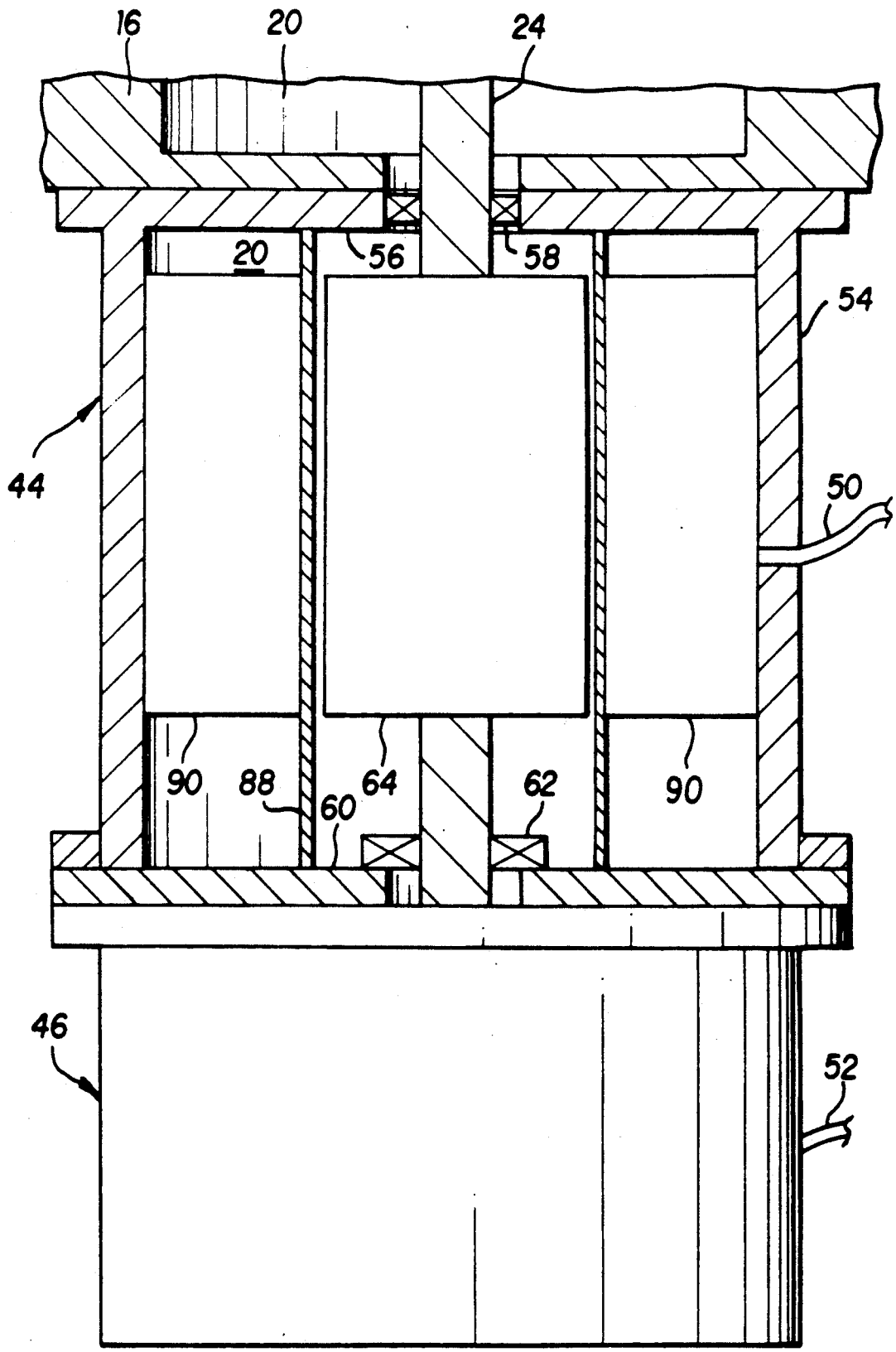
FIG. 4 is an enlarged longitudinal sectional schematic view of the control rod drive of FIG. 2, including a motor and brake, in accordance with another embodiment of the invention.

Illustrated in FIG. 4 is another embodiment of the present invention which is generally similar to the embodiment illustrated in FIG. 3 except that the means for rotating the armature 64 are disposed outside the pressure vessel and not in contact with the pressurized fluid 20. More specifically, the motor 44 in this embodiment of the invention, further includes an annular, tubular structural membrane 88 fixedly joined to the first and second spokes 56 and 60 and spaced inwardly from the motor housing 54 for forming a portion of the pressure vessel 10 for containing the pressurized fluid 20 inside the membrane 88, the manifold 16, and the brake 46. Means for rotating the armature 64 in the form of a conventional electrical motor stator 90 is disposed outside the membrane 88 protected thereby from contact with the pressurized fluid 20 within the membrane 88. In this embodiment of the invention, the first electrical line 50 is channeled through the motor housing 54 without the need for a seal, such as the bushing 68 illustrated in FIG. 3, since the stator 90 is not surrounded by the pressurized fluid 20. The membrane 88 may be any suitable material which allows the stator 90 to magnetically rotate the armature 64 by electromagnetic force through the membrane 88 upon providing power through the first electrical line 50 to the stator 90. For example, the membrane 88 may be formed from conventional ferritic or austenitic material. The brake 46 illustrated in FIG. 4 is identical to the brake 46 illustrated in FIG. 3.

Figure 5:
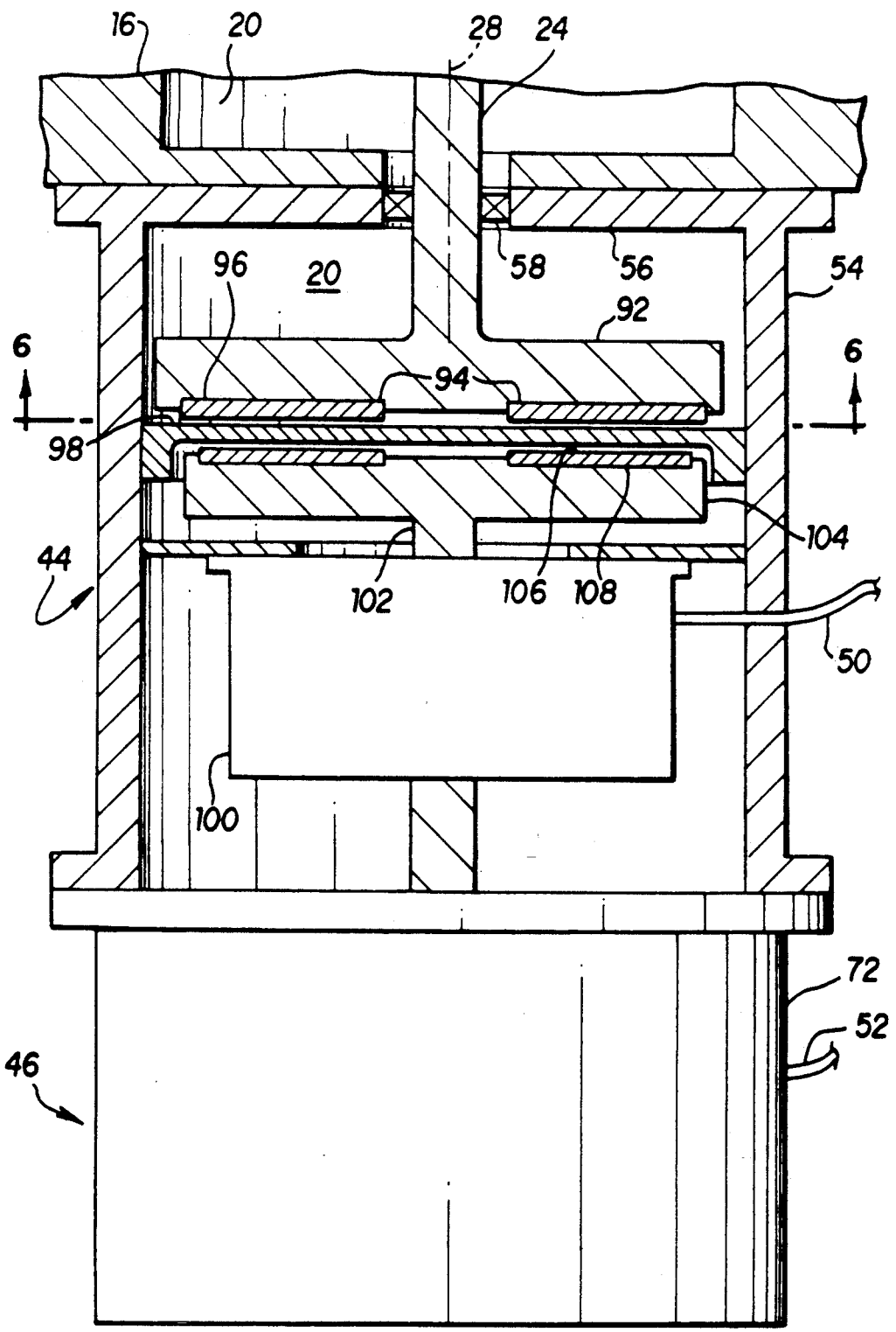
FIG. 5 is an enlarged longitudinal sectional schematic view of the control rod drive of FIG. 2, including a motor and brake, in accordance with another embodiment of the invention.
Figure 6:
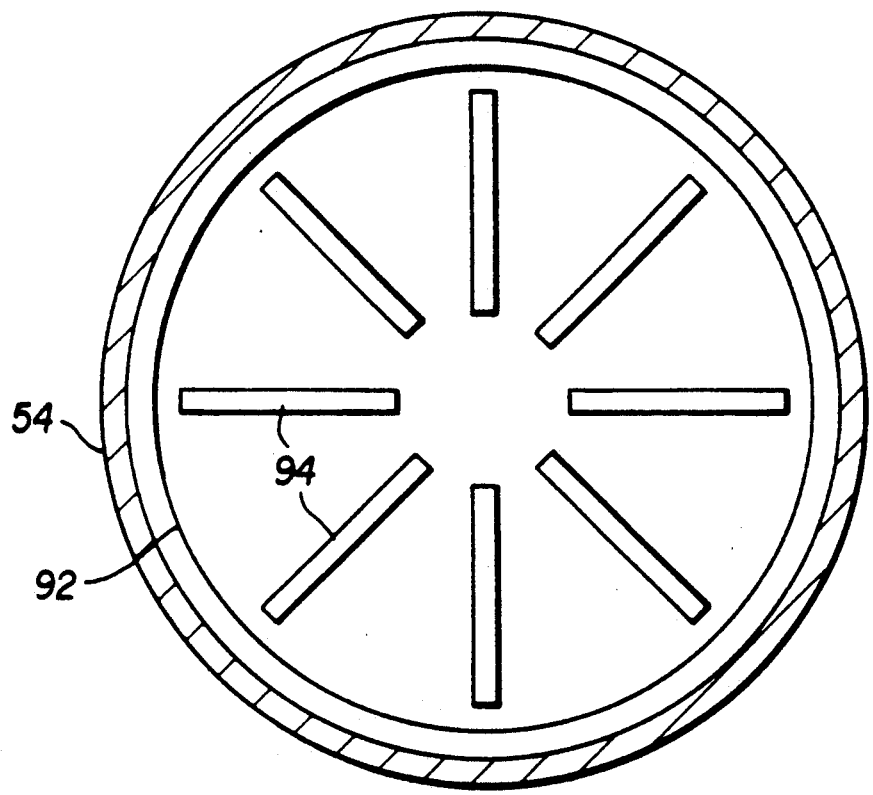
FIG. 6 is a transverse sectional view of the control rod drive motor of FIG. 5 taken along line 6—6.

Illustrated in FIGS. 5 and 6 is another embodiment of the present invention wherein a flat first disc 92 comprises the driven rotor fixedly joined to the spindle 24. The first disc 24 is disposed substantially perpendicularly to the centerline axis 28 and includes a plurality of circumferentially spaced and radially extending first permanent magnets 94 conventionally fixedly joined in complementary recesses 96 in one of the faces of the first disc 92. An annular, flat plate membrane 98 is conventionally fixedly joined to the housing 54 and faces the first permanent magnets 94. The membrane 98 forms a part of the pressure vessel 10 for containing the pressurized fluid 20 inside the portion of the housing 54 which surrounds the first disc 92 and the spindle 24.

A conventional electrical motor 100 is conventionally disposed inside the housing 54 on the nonpressure-side of the membrane 98 and includes an output shaft 102, and a flat second disc 104 fixedly joined to the output shaft 102. The second disc 104 includes a plurality of circumferentially spaced and radially extending second permanent magnets 106 conventionally fixedly disposed in complementary recesses 108 therein. The second magnets 106 face the membrane 98 adjacent to the first magnets 94 on opposite sides of the membrane 98 for conventionally generating a magnetic coupling force therebetween. The electrical wire 50 is suitably conventionally joined to the electrical motor 100 through the nonpressurized portion of the housing 54 for selectively powering the motor 100 to rotate the second disc 104 which, in turn, rotates the first disc 92 by magnetic coupling therewith, and in turn rotates the spindle 24. The membrane 98 may comprise any suitable conventional material including ferritic or austenitic material. As illustrated in FIG. 5, the brake 46 may be identical to the brake 46 illustrated in the previous embodiments of the present invention, except, however, that the membrane 98 prevents the pressurized fluid 20 from flowing inside the brake housing 72.

Figure 7:
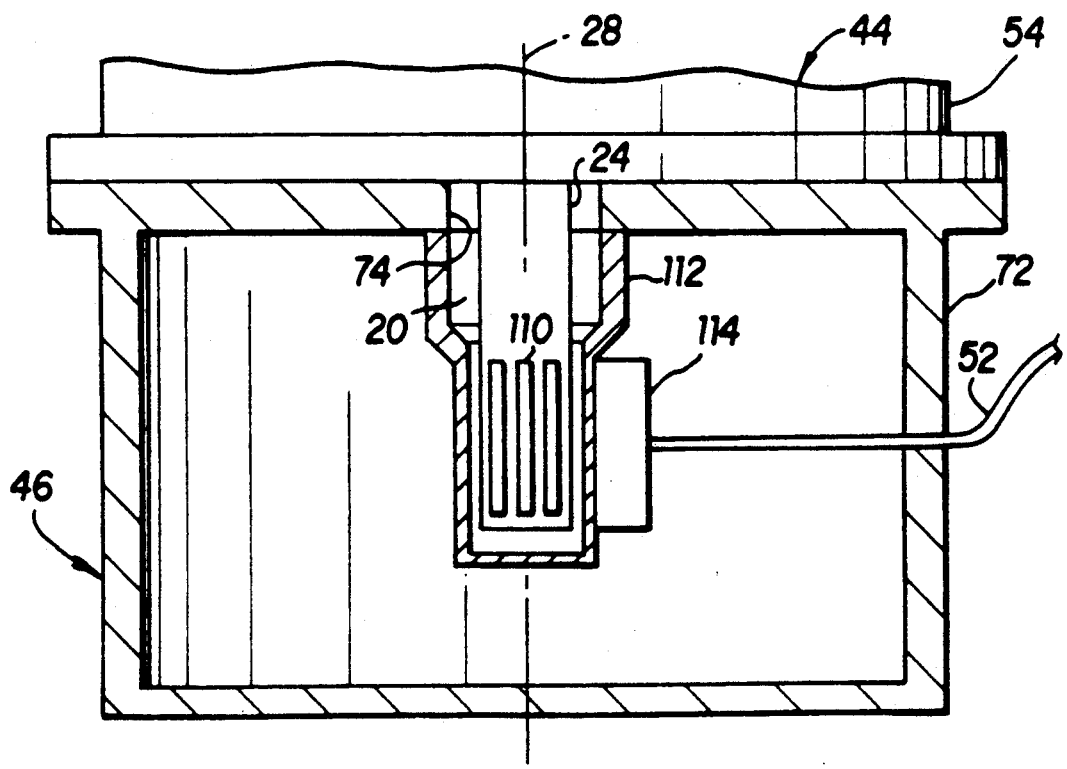
FIG. 7 is an enlarged longitudinal schematic sectional view of an alternate embodiment of the control rod drive brake of the present invention.

Illustrated in FIG. 7 is an alternate form of the brake 46 which may be utilized for any of the embodiments of the invention disclosed herein. More specifically, the brake 46 includes a plurality of circumferentially spaced permanent magnets 110 conventionally fixedly joined to an end of the spindle 24. The magnets 110 are elongate and extend generally parallel to the longitudinal axis 28. A cup-like tubular membrane 112 surrounds the magnets 110 at the end of the spindle 24 and is fixedly joined to the brake housing 72 around the aperture 74 for forming a portion of the pressure vessel 10 for containing the pressurized fluid 20 inside the membrane 112 and around the spindle 24. A conventional electromagnet 114 is conventionally joined to the outside of the membrane 112 adjacent to the magnets 110 and is selectively energizable by power provided through the second electrical line 52 connected thereto for generating an electromagnet force coupled to the magnets 110 for preventing rotation of the spindle 24. When the electromagnet 114 is deenergized, the spindle 24 is allowed to rotate without restriction from the electromagnet 114. The membrane 112 may be any conventional material for containing the pressurized fluid 20 while allowing coupling of the electromagnetic forces between the electromagnet 114 and the permanent magnets 110. For example, the membrane 112 may be formed from ferritic or austenitic material.

The embodiment of the motor 46 illustrated in FIG. 7 may be used in conjunction with any of the embodiments of the motor 44 described herein whether the membrane 112 confines the pressurized fluid 20 as in the embodiments illustrated in FIGS. 3 and 4, or does not confine the pressurized fluid 20, such as would occur in the embodiment of the invention illustrated in FIG. 5 wherein the membrane 98 prevents the pressurized fluid 20 from reaching the brake 46.

Figure 8:
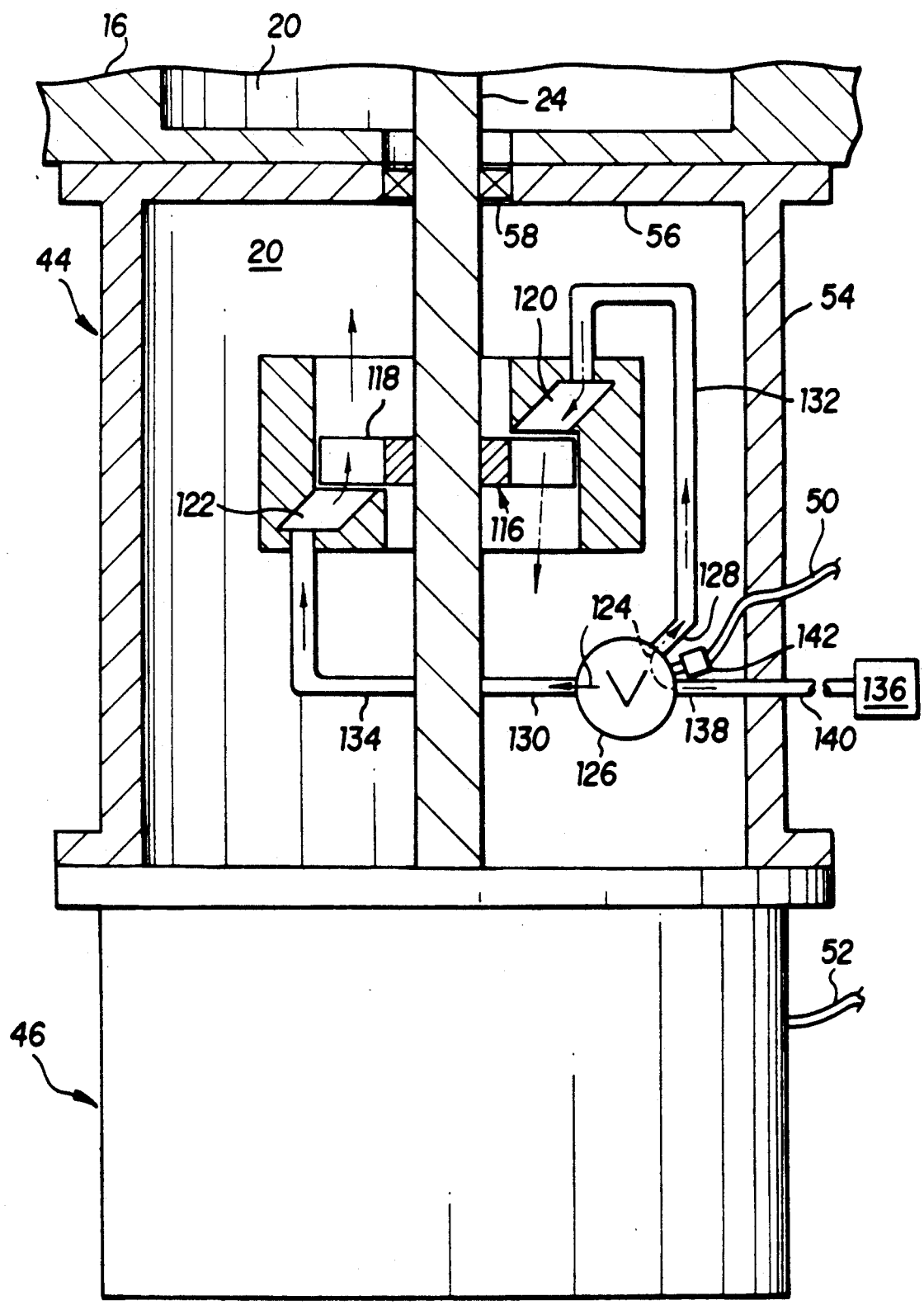
FIG. 8 is an enlarged longitudinal sectional schematic view of the control rod drive of FIG. 2, including a motor and brake, in accordance with another embodiment of the invention.

Illustrated in FIG. 8 is another embodiment of the present invention which includes a conventional turbine rotor 116 as the driven rotor suitably fixedly connected to the spindle 24. The turbine rotor 116 includes a plurality of circumferentially spaced conventional blades 118. Conventional first and second turbine nozzles 120 and 122, respectively are provided for channeling fluid to rotate the rotor 118 in either the clockwise or counterclockwise directions.

More specifically, the first nozzle 120 is conventionally configured relative to the turbine rotor 118 for channeling a pressurized driving fluid 124 through the first nozzle 120 against the rotor blades 118 for rotating the rotor 116 in the first, clockwise direction. The second turbine nozzle 122 is similarly configured relative to the rotor 116, for example on an opposite side thereof, for obtaining an opposite inclination angle of the driving fluid 124 on the blades 118 for rotating the rotor in the second, or counterclockwise direction. A conventional valve 126 having a first outlet 128 and a second outlet 130 is provided for selectively channeling the driving fluid 124 to one of the first and second outlets 128 and 130. A conventional first fluid conduit 132 is joined in fluid communication with the first nozzle 120 and the first valve outlet 128, and a second fluid conduit 134 is joined in fluid communication with the second nozzle 122 and the second valve outlet 130.

A conventional high pressure fluid supply 136 for the driving fluid 124 is suitably joined to an inlet 138 of the valve 126 by a supply conduit 140 which suitably extends through the housing 54 in conventional sealing relationship therewith.

A conventional electrical solenoid 142 is suitably joined to the valve 126 for selectively positioning the valve 126 for channeling the driving fluid 124 either through the first outlet 128 or the second outlet 130 upon being energized or deenergized by electrical power provided by the first electrical line 50 suitably extending through the housing 54 in sealed relationship therewith.

In the embodiment of the invention illustrated in FIG. 8 both the turbine rotor 116 and the turbine nozzles 120 and 122 are disposed inside the pressure vessel motor housing 54 in contact with the pressurized fluid 20. Accordingly, there is no need to extend the spindle 24 through the pressure vessel, which would then require a suitable seal therefor. Only the fluid supply conduit 140 and the first electrical line 50, which extend through the housing 54, need be sealed, which may be done in any conventional fashion. In operation, the driving fluid supply 136 provides the driving fluid 124 at a suitably high pressure which is selectively channeled through either the first nozzle 120 or the second nozzle 122 for rotating the turbine rotor 116 in opposite directions. The driving fluid 124 is discharged from the turbine rotor 116 inside the motor housing 54 and is mixed with the pressurized fluid 20 and conventionally discharged through the control rod drive 12 through the aperture 38, as illustrated in FIG. 2.

In an alternate embodiment of the invention, the flow rate of the driving fluid 124 may be suitably increased by the supply 136 when it is flowing through the nozzle 122, for example, for not only rotating the spindle 24 in the counterclockwise direction for inserting the control rod 40, but for providing also the scram function. In this operation, the increased driving fluid 124 discharged from the nozzle 122 is channeled from the housing 54 and into the manifold 16 and upwardly past the piston 32 for rapidly lifting the piston 32 for inserting the control rod 40.

The brake 46 utilized in the embodiment of the invention illustrated in FIG. 8 may be any of the brakes described above.

The several embodiments of the present invention described above all include a driven rotor joined to the spindle 24 and disposed within the pressure vessel containing the pressurized fluid 20. The means for rotating the driven rotor include those disposed inside the pressure vessel, such as the stator 66 illustrated in FIG. 3, and the turbine nozzles 120 and 122 illustrated in FIG. 8, and those disposed outside the pressure vessel, such as the stator 90 illustrated in FIG. 4 and the motor 100 and second disc 104 illustrated in FIG. 5. In all of these embodiments, the need for extending the spindle 24 through the pressure vessel has been eliminated, thusly eliminating the need for any type of sealing which would otherwise be required, such as the conventional packing-type seal assembly described above.

Furthermore, the invention preferably also includes, as described above, a brake for the spindle 24 which similarly obviates the need for providing a packing-type seal assembly for the spindle 24, which would be required if the spindle 24 were to extend through the pressure vessel from a region of high pressure to a region of low pressure.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A drive for moving a control rod along a longitudinal axis in a reactor vessel containing a pressurized fluid comprising:
   a pressure vessel fixedly joinable in flow communication with said reactor vessel;
   a spindle disposed solely within said pressure vessel;
   means for moving said control rod upon rotatoin of said spindle;
   a driven rotor fixedly joined to said spindle within said pressure vessel for rotating said spindle; and
   means spaced from said driven rotor for selectively rotating said driven rotor in first and second opposite directions without breaching said pressure vessel between said driven rotor and said retaining means.

2. A control rod drive according to claim 1 wherein said pressure vessel includes a tubular housing fixedly joinable in flow communication with said reactor vessel and containing said moving means; and a motor housing fixedly joined to said tubular housing in flow communication therewith and containing said driven rotor and said rotating means; and said rotating means are disposed inside said motor housing in contact with said pressurized fluid.

3. A control rod drive according to claim 2 wherein said drive rotor comprises an electrical motor armature disposed in said motor housing, said rotating means comprise an electrical motor stator disposed in said motor housing, and further including an electrical wire extending through said motor housing to said stator for selectively energizing said stator for magnetically rotating said armature and, in turn, said spindle.

4. A control rod drive according to claim 2 wherein said driven rotor comprises a turbine rotor disposed in said motor housing, said rotating means comprise a turbine nozzle disposed in said motor housing, and further including a fluid conduit joined in fluid communication with said turbine nozzle for selectively channeling a pressurized driving fluid through said nozzle and against said rotor for rotating said rotor and said spindle.

5. A control rod drive according to claim 4 wherein said rotating means further include:
   a first nozzle configured relative to said rotor for channeling said driving fluid through said rotor for rotating said rotor in a first direction;
   a second nozzle configured relative to said rotor for channeling said driving fluid through said rotor for rotating said rotor in a second direction, opposite to said first direction;
   a valve for selectively channeling said driving fluid to one of a first outlet and a second outlet thereof;
   a first fluid conduit joined in fluid communication with said first nozzle and said first valve outlet; and
   a second fluid conduit joined in fluid communication with said second nozzle and said second valve outlet.

6. A control rod drive according to claim 1 wherein said pressure vessel includes a tubular housing containing said moving means, and a motor housing membrane disposed between said driven rotor and said rotating means, and said rotating means are disposed outside said motor housing membrane and not in contact with said pressurized fluid.

7. A control rod drive according to claim 6 wherein said driven rotor comprises an electrical motor armature disposed inside said membrane, said rotating means comprise an electrical motor stator disposed outside said membrane, and further including an electrical wire joined to said stator for selectively energizing said stator for magnetically rotating said armature by electromagnetic force through said membrane.

8. A control rod drive according to claim 6 wherein:
   said drive rotor comprises a flat first disc having a plurality of circumferentially spaced and radially extending first permanent magnets disposed therein and facing said membrane;
   said rotating means comprise an electrical motor having an output shaft, and a flat second disc having a plurality of cicumferentially spaced and radially extending second permanent magnets disposed therein and facing said membrane adjacent to said first permanent magnets for generating a magnetic coupling force therebetween; and
   further including an electrical wire joined to said motor for selectively powering said motor to rotate said second disc and, in turn, rotate said first disc and said spindle in said first and second directions.

9. A control rod drive according to claim 2 wherein said pressure vessel further includes a brake housing fixedly joined to said motor housing in flow communication therewith, and further including means disposed inside said brake housing for selectively braking said spindle.

10. A control rod drive according to claim 9 wherein said braking means comprise:
    a braking gear fixedly joined to said spindle;
    an electrical solenoid having an extendable plunger disposed therein;
    a braking latch joined to said plunger and positionable in an engaged position with said braking gear for preventing rotation of said spindle in at least one of said first and second directions, and in a disengaged position allowing unrestricted rotation of said spindle.

11. A control rod drive according to claim 9 wherein said braking means comprise:
    a plurality of circumferentially spaced permanent magnets fixedly joined to said spindle inside said brake housing; and
    an electromagnet joined outside said brake housing adjacent to said magnets and being selectively energizable for generating an electromagnetic force coupled to said magnets for preventing rotation of said spindle, and deenergizable for allowing unrestricted rotation of said spindle.

* * * * *